United States Patent Office 2,838,571
Patented June 10, 1958

2,838,571

3,5-DIALKYL-4-HYDROXYBENZYL ETHERS

Allen H. Filbey, Walled Lake, Mich., assignor to Ethyl Corporation, New York, N. Y., a corporation of Delaware No Drawing. Application September 23, 1955
Serial No. 536,318

5 Claims. (Cl. 260—611)

This invention relates to novel chemical compounds having utility in the chemical arts. In particular, this invention relates to certain asymmetric ethers.

Among the objects of this invention is that of providing new and useful chemical compounds. Another object is to provide methods of preparing these new chemical compounds. A particular object of this invention is to provide certain novel and useful asymmetric ethers and methods for their preparation. Other objects will be apparent from the ensuing description.

The above and other objects of this invention are accomplished by providing, as new compositions of matter, 3,5-dialkyl-4-hydroxybenzyl ethers having the general formula

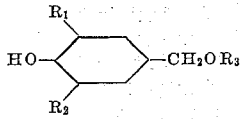

wherein $R_1$ is an alkyl group containing from 3 to 8 carbon atoms and is branched on the alpha carbon atom, $R_2$ is an alkyl group containing from 1 to 8 carbon atoms, and $R_3$ is selected from the group consisting of alkyl, cycloalkyl, aralkyl, and alkenyl. In the above compounds it is preferable that the groups designated by $R_3$ contain up to about 12 carbon atoms.

A preferred embodiment of this invention relates to 3,5-dialkyl-4-hydroxybenzyl ethers as above defined, in which $R_1$ and $R_2$ are both alkyl groups containing from 3 to 8 carbon atoms, both of said alkyl groups being branched on their respective alpha carbon atoms, and $R_3$ is a lower alkyl group—i. e., an alkyl group containing from 1 to 6 carbon atoms. The compounds of this preferred embodiment are particularly useful in various applications and are prepared in good yield and high purity from readily available, inexpensive starting materials.

The compounds of this invention for the most part are white or pale yellow crystalline solids and are soluble in various organic solvents and in gasolines, diesel fuels, hydrocarbon oils, and the like. These compounds are further characterized by being relatively stable, and for the most part easily crystallizable materials.

The compounds of this invention are prepared by reacting (1) a 2,6-dialkyl phenol in which one of the alkyl groups contains from 3 to 8 carbon atoms and is branched on its alpha carbon atom and the other alkyl group contains from 1 to 8 carbon atoms, (2) formaldehyde, and (3) a monohydric alcohol in which the organic portion conforms with the group designated hereinabove as $R_3$, in the presence of a catalytic quantity of a metallic hydroxide condensation catalyst, said metallic hydroxide being of a metal selected from the group consisting of alkali and alkaline earth metals. The reaction temperature of this process is in the range of about 20 to about 100° C. It is preferred to conduct the process of this invention within the range of about 30 to about 80° C.

In conducting the above process, the relative proportions of the three reactants can be varied. The actual condensation reaction involves reaction among equimolar amounts of the three reactants. However, it is frequently advantageous to employ excess monohydric alcohol, which excess constitutes an efficacious reaction solvent. Likewise, it is frequently advantageous to employ an excess of formaldehyde in relation to the amount of phenol used because such excess results in higher yield of the desired ether. Thus, the process of this invention can be conducted using from 1 to about 20 moles of monohydric alcohol and from 1 to about 2 moles of formaldehyde per mole of appropriate 2,6-dialkyl phenol used.

The mole ratios of formaldehyde discussed above are based upon the use of formaldehyde monomer. If a polymer of formaldehyde is employed, the amount of this polymer used is based upon the moles of the monomer appearing in the polymer. A particularly convenient form of formaldehyde is an aqueous solution thereof, known in the art as a formalin solution. By using such a solution in the process of this invention the necessity of using gaseous formaldehyde is avoided.

The metallic hydroxide condensation catalyst is employed in catalytic quantity. This quantity ranges from about 1 to about 50 percent by weight based on the weight of the phenol used in conducting the process. Deviations from these ranges of proportions are permissible, particularly when an excess of alcohol is employed. The alkali metal hydroxide catalysts include lithium hydroxide, sodium hydroxide, potassium hydroxide, rubidium hydroxide and cesium hydroxide. The alkaline earth metallic hydroxides used as catalysts in the process of this invention include magnesium hydroxide, calcium hydroxide, strontium hydroxide and barium hydroxide. Mixtures of these catalysts can be used, especially mixtures of a plurality of alkali metal hydroxides or alkaline earth metal hydroxides. Of the foregoing hydroxides, sodium hydroxide, potassium hydroxide and calcium hydroxide are readily available at low cost and are preferably used.

The compounds of this invention and their preparation are illustrated by the following specific examples, wherein all parts and percentages are by weight.

*Example I*

In a reaction vessel equipped with stirring means, reflux condenser, and reagent-adding device were placed 100 parts of 95 percent ethanol, 9 parts of 37 percent aqueous formalin solution, 18 parts of 2,6-diisopropyl phenol, and 7 parts of potassium hydroxide. This mixture was stirred at 75° C. for 3.5 hours. After adding 100 parts of water and 10 parts of concentrated hydrochloric acid, the organic phase was decanted and dried. Vacuum distillation at 1 millimeter of mercury pressure gave 12 parts of (3,5-diisopropyl-4-hydroxybenzyl) (ethyl) ether melting at 50–51° C. Analysis—calculated for $C_{15}H_{24}O_2$: Carbon, 76.2 percent; hydrogen, 10.2 percent. Found: Carbon, 76.1 percent; hydrogen, 10.2 percent.

*Example II*

In the reaction vessel of Example I were placed 40 parts of absolute ethanol, 9 parts of a 37 percent aqueous formalin solution, 20 parts of 2,6-di-tert-butylphenol, and 7 parts of potassium hydroxide. This mixture was stirred at 45° C. for 1 hour. The product which was isolated from the neutralized organic phase melted at 38–38.5° C. Analysis—calculated for (3,5-di-tert-butyl-4-hydroxybenzyl)(ethyl)ether: Carbon, 77.4 percent; hydrogen, 10.7 percent. Found: Carbon, 77.8 percent; hydrogen, 10.8 percent.

*Example III*

(3,5-di-tert-butyl-4-hydroxybenzyl) (methyl) ether was prepared as follows: In the reaction vessel described in Example I were placed 40 parts of methanol, 9 parts of a 37 percent aqueous formalin solution, 21 parts of 2,6-di-tert-butylphenol, and 4 parts of sodium hydroxide. The mixture was heated at 50° C. for 6 hours. The product was recovered by neutralization followed by distillation as described in Example I. The purified (3,5-di-tert-butyl-4-hydroxybenzyl)(methyl) ether was a pale yellow crystalline material melting at 96° C.

*Example IV*

In the reaction equipment described in Example I are placed 60 parts of isobutanol, 9 parts of a 37 percent aqueous formalin solution, 19 parts of 2-isopropyl-6-tert-butylphenol, and 4 parts of sodium hydroxide. After heating the mixture at 60° C. for 4 hours the reaction mixture is distilled at 5 millimeters of mercury pressure to give (3-isopropyl-5-tert-butyl-4-hydroxybenzyl)(isobutyl) ether.

*Example V*

One hundred parts of cyclohexanol, 12 parts of a 37 percent aqueous solution of formalin, and 16 parts of 2-methyl-6-tert-butylphenol are reacted in the presence of 1 part of sodium hydroxide at a temperature of 80° C. The reaction time is 4 hours. After this time the reaction mixture is poured into cold water, neutralized with 10 percent hydrochloric acid solution, and the organic phase separated. The organic phase is distilled at 10 millimeters of mercury pressure to yield (3-methyl-5-tert-butyl-4-hydroxybenzyl)(cyclohexyl) ether.

*Example VI*

(3-methyl-5-(1,1,3,3-tetramethylbutyl)-4-hydroxybenzyl)(benzyl) ether is prepared by reacting 80 parts of benzyl alcohol, 9 parts of a 37 percent aqueous formalin solution, and 22 parts of 2-methyl-6-(1,1,3,3-tetramethylbutyl) phenol in the presence of 1 part of potassium hydroxide. The reaction conditions are 70° C. for 4 hours. Neutralization and separation of the organic phase followed by distillation at 10 millimeters of mercury pressure yields the desired product.

*Example VII*

In the reaction equipment described in Example I are placed 50 parts of allyl alcohol, 9 parts of a 37 percent aqueous formalin solution, 32 parts of 2,6-di-(2-octyl) phenol, and 1 part sodium hydroxide. The reaction is carried out at 20° C. for 10 hours. (3,5-di-(2-octyl)-4-hydroxybenzyl)(allyl) ether is isolated by neutralization followed by vacuum distillation at 5 millimeters of mercury pressure.

*Example VIII*

At a temperature of 80° C. and in the presence of 3 parts of potassium hydroxide, reaction is caused to occur among 100 parts of n-dodecyl alcohol, 9 parts of a 37 percent aqueous formalin solution, and 15 parts of 2-methyl-6-isopropyl phenol. After reaction for 4 hours (3-methyl-5-isopropyl-4-hydroxybenzyl)(dodecyl) ether is obtained by employing the workup procedure described in Example I.

*Example IX*

(3-ethyl-5-tert-amyl-4-hydroxybenzyl)(n-hexyl) ether is prepared as follows: To the reaction vessel described in Example I are added 50 parts of 1-hexanol, 9 parts of a 37 percent aqueous formalin solution, 16 parts of 2-ethyl-6-tert-amyl phenol, and 4 parts of sodium hydroxide. After holding the reaction mixture at 60° C. for 6 hours the product is isolated as described in Example I.

*Example X*

Seventy parts of p-ethylbenzyl alcohol, 9 parts of a 37 percent aqueous formalin solution, 18 parts of 2,6-di-isopropyl phenol, and 1 part of potassium hydroxide are combined and placed in the reaction vessel described in Example I. The mixture is heated at 40° C. for 3 hours. Neutralization and vacuum distillation of the organic phase at 5 millimeters of mercury pressure gives (3,5-diisopropyl-4-hydroxybenzyl)(p-ethylbenzyl) ether.

*Example XI*

(3,5-di-tert-butyl-4-hydroxybenzyl)(9-decenyl) ether is prepared by combining the following reactants in the presence of 1 part of sodium hydroxide: 90 parts of 1-hydroxy-9-decene, 9 parts of a 37 percent aqueous formalin solution, and 21 parts of 2,6-di-tert-butylphenol. The product is isolated as described in Example I after maintaining the reaction temperature at 30° C. for 6 hours.

*Example XII*

To the reaction vessel described in Example I are added the following ingredients: 80 parts of o-methylcyclohexanol, 18 parts of a 37 percent aqueous formalin solution, 20 parts of 2-isopropyl-6-tert-butylphenol, and 1 part of sodium hydroxide. After heating this mixture at 60° C. for 4 hours the mixture is neutralized and the organic phase separated. Vacuum distillation at 5 millimeters of mercury pressure gives (3-isopropyl-5-tert-butyl-4-hydroxybenzyl)(o-methylcyclohexyl) ether.

It can be seen from the above illustrative examples that the monohydric alcohols employed in the process of this invention comprise alkanols, cycloalkanols, aralkanols, and alkenols which preferably contain up to about 12 carbon atoms.

Typical compounds of this invention include (3-methyl-5-isopropyl-4-hydroxybenzyl)(methyl) ether, (3-methyl-5-tert-butyl-4-hydroxybenzyl)(ethyl) ether, (3-ethyl-5-tert-amyl-4-hydroxybenzyl)(isopropyl) ether, (3-methyl-5-(2-heptyl)-4-hydroxybenzyl)(butyl) ether, (3-ethyl-5-(1,1,3,3-tetramethyl-butyl)-4-hydroxybenzyl)(dodecyl) ether, (3,5-diisopropyl-4-hydroxybenzyl)(cyclohexyl) ether, (3,5-di-tert-butyl-4-hydroxybenzyl)(p-ethylcyclohexyl) ether, (3-isopropyl-5-tert-butyl-4-hydroxybenzyl)(benzyl) ether, (3-methyl-5-tert-amyl-4-hydroxybenzyl)(p-methylbenzyl), (3,5-di-tert-amyl-4-hydroxybenzyl)(allyl) ether, (3,5-diisopropyl-4-hydroxybenzyl)(7-octenyl) ether, (3,5-di-sec-butyl-4-hydroxybenzyl)(4-hexenyl) ether, (3,5-di-isopropyl-4-hydroxybenzyl)(heptyl) ether, (3,5-di-tert-butyl-4-hydroxybenzyl)(2-dodecyl) ether, and the like.

The preferred embodiment of this invention is illustrated by such compounds as (3,5-diisopropyl-4-hydroxybenzyl)(methyl) ether, (3,5-diisopropyl-4-hydroxybenzyl)(isopropyl) ether, (3,5-diisopropyl-4-hydroxybenzyl)-(hexyl) ether, (3,5-di-tert-butyl-4-hydroxybenzyl)(ethyl) ether, (3,5-di-tert-butyl-4-hydroxybenzyl)(tert-butyl) ether, (3,5-di-tert-butyl-4-hydroxybenzyl)(amyl) ether, (3-isopropyl-5-tert-butyl-4-hydroxybenzyl)(methyl) ether, (3,5-di-tert-amyl-4-hydroxybenzyl)(tert-amyl) ether, (3-isopropyl-5-(1,1,2,2-tetramethylpropyl)-4-hydroxybenzyl)(ethyl) ether, (3,5-di-(1,1,3,3-tetramethylbutyl)-4-hydroxybenzyl)(1,1-dimethylbutyl) ether, and the like.

The compounds of this invention find important utility as plasticizers, germicides, die and mold lubricants, and humectants. The compounds of this invention are also very useful as antioxidants for oxygen-sensitive organic materials normally tending to deteriorate when in contact with oxygen, air, or ozone. Thus, the compounds of this invention may be added to, or blended with, such materials as gasoline; leaded gasoline, i. e. gasoline which contains a lead alkyl antiknock compound such as tetraethyllead; tetraalkyllead compounds such as tetramethyllead, tetraethyllead, etc.; lubricating oils; turbine oils, transformer oils; industrial oils such as gear oil, cutting oil, transmission lubricants, glass annealing oils, brake fluids, etc.; greases, high molecular weight polymers such as natural and synthetic rubber, polyethylene, polystyrene, polyisobutylene, etc.; diesel fuels; domestic heating oils; bunker oils; asphalt; and the like. Those compounds of this invention containing an alkenyl radical attached to the ether oxygen atom are also useful as copolymers in the formulation of novel and useful resins, copolymers, and the like. The compounds of this invention are also useful as chemical intermediates in the synthesis of other new and useful chemical compounds.

I claim:
1. As new compositions of matter, 3,5-dialkyl-4-hydroxybenzyl ethers having the general formula

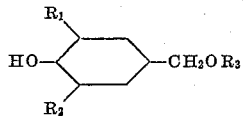

wherein $R_1$ is an alkyl group containing from 3 to 8 carbon atoms and is branched on the alpha carbon atom, $R_2$ is an alkyl group containing from 1 to 8 carbon atoms, and $R_3$ is selected from the group consisting of alkyl, cycloalkyl, aralkyl, and alkenyl.

2. As a new composition of matter, 3,5-diisopropyl-4-hydroxybenzyl ethyl ether.

3. Process of preparing 3,5-dialkyl-4-hydroxybenzyl ethers which comprises reacting (1) a 2,6-dialkyl phenol in which one of the alkyl groups contains from 3 to 8 carbon atoms and is branched on its alpha carbon atom and the other alkyl group contains from 1 to 8 carbon atoms, (2) formaldehyde, and (3) a monohydric alcohol having the general formula $R_3OH$, wherein $R_3$ is selected from the group consisting of alkyl, cycloalkyl, aralkyl, and alkenyl, in the presence of a catalytic quantity of a metallic hydroxide condensation catalyst, said metallic hydroxide being of a metal selected from the group consisting of alkali and alkaline earth metals; there being present in the reaction mixture from 1 to about 20 moles of said alcohol and from 1 to about 2 moles of formaldehyde per mole of said phenol.

4. As a new composition of matter, 3,5-di-tert-butyl-4-hydroxybenzyl ethyl ether.

5. As a new composition of matter, 3,5-di-tert-butyl-4-hydroxybenzyl methyl ether.

References Cited in the file of this patent
UNITED STATES PATENTS
2,647,102    Ambelang _____ July 23, 1953